United States Patent [19]
Becker

[11] Patent Number: 5,484,320
[45] Date of Patent: Jan. 16, 1996

[54] ANIMAL CALL

[76] Inventor: Earl J. Becker, 34 Church La., Wayne, N.J. 07470

[21] Appl. No.: 440,488

[22] Filed: May 12, 1995

[51] Int. Cl.⁶ ..................................................... A63H 5/00
[52] U.S. Cl. ............................................. 446/418; 84/404
[58] Field of Search ...................... 446/397, 418, 446/421

[56] References Cited

U.S. PATENT DOCUMENTS

| | | | |
|---|---|---|---|
| 644,817 | 3/1900 | Deagan | 84/402 |
| 976,718 | 11/1910 | Bartholomae | 84/402 |
| 2,749,659 | 6/1956 | Elstein | 84/404 |
| 3,766,683 | 10/1973 | Vennola | 446/418 |
| 3,828,468 | 8/1974 | Palumbo | 446/421 |
| 4,127,053 | 11/1978 | Cohen | 84/402 |
| 4,610,641 | 9/1986 | Allen | 446/397 |
| 4,850,928 | 7/1989 | Stewart | 446/397 |
| 4,988,325 | 1/1991 | Alderson | 446/397 |

OTHER PUBLICATIONS

"Perfection Educational Rhythm Band Instruments" Catalog #9, p. 22.

Primary Examiner—Robert A. Hafer
Assistant Examiner—Jeffrey D. Carlson

[57] ABSTRACT

An animal call is made of a cylindrical drum having an aperture formed in opposing ends thereof. One of the apertures formed in the opposing ends has a greater width than the other. The cylindrical drum has a receiving recess formed therein intermediate of the opposing ends. An elongated handle is secured within the receiving recess formed in the cylindrical drum. The elongated handle is positioned orthogonally to the cylindrical drum. A striking bar is adapted for use in striking the cylindrical drum to generate sounds made by animals.

3 Claims, 3 Drawing Sheets

ANIMAL CALL

BACKGROUND OF THE INVENTION

1. Field of the Invention

The present invention relates to an animal call and more particularly pertains to creating a sound similar to eating sounds made by squirrels and woodpeckers with an animal call.

2. Description of the Prior Art

The use of deer calls is known in the prior art. More specifically, deer calls heretofore devised and utilized for the purpose of emitting sounds similar to squirrels are known to consist basically of familiar, expected and obvious structural configurations, notwithstanding the myriad of designs encompassed by the crowded prior art which have been developed for the fulfillment of countless objectives and requirements.

By way of example, U.S. Pat. No. 4,850,925 to Ady discloses a deer call.

U.S. Pat. No. Des. 312,056 to Ady discloses the ornamental design for a deer call.

U.S. Pat. No. 5,158,494 to Ball discloses a rattling device for attracting animals.

U.S. Pat. No. Des. 309,121 to Stewart discloses the ornamental design for a sound-producing rattling antler for attracting deer and elk.

U.S. Pat. No. Des. 309,120 to Stewart discloses the ornamental design for a sound-producing rattling antler for attracting deer and elk.

U.S. Pat. No. 5,019,008 to Hughes discloses a game call.

While these devices fulfill their respective, particular objective and requirements, the aforementioned patents do not describe an animal call for creating a sound similar to eating sounds made by squirrels and woodpeckers.

In this respect, the animal call according to the present invention substantially departs from the conventional concepts and designs of the prior art, and in doing so provides an apparatus primarily developed for the purpose of creating a sound similar to eating sounds made by squirrels and woodpeckers.

Therefore, it can be appreciated that there exists a continuing need for new and improved animal call which can be used for creating a sound similar to eating sounds made by squirrels and woodpeckers. In this regard, the present invention substantially fulfills this need.

SUMMARY OF THE INVENTION

In the view of the foregoing disadvantages inherent in the known types of deer calls now present in the prior art, the present invention provides an improved animal call. As such, the general purpose of the present invention, which will be described subsequently in greater detail, is to provide a new and improved animal call and method which has all the advantages of the prior art and none of the disadvantages.

To attain this, the present invention essentially comprises a cylindrical drum having a first end, a second end, and an intermediate extent therebetween. The first end has an aperture formed therein. The second end has an aperture formed therein. The aperture formed in the first end has a width about twice as wide as the aperture formed in the second end. The intermediate extent has a receiving recess formed therein. The device contains an elongated handle having a first end, a second end, and an intermediate extent therebetween. The first end is secured within the receiving recess formed in the intermediate extent of the cylindrical drum. The elongated handle is positioned orthogonally to the cylindrical drum. The elongated handle has a through hole formed inwardly of the second end thereof. The device contains a striking bar having a first end, a second end, and an intermediate extent therebetween. The striking bar has a through hole formed inwardly of the second end thereof. The device contains a leather thong having a first end and a second end. The first end is secured to the through hole of the elongated handle. The second end is secured to the thorough hole of the striking bar.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved animal call which has all the advantages of the prior art deer calls and none of the disadvantages.

It is another object of the present invention to provide a new and improved animal call which may be easily and efficiently manufactured and marketed.

It is a further object of the present invention to provide a new and improved animal call which is of durable and reliable construction.

An even further object of the present invention is to provide a new and improved animal call which is susceptible of a low cost of manufacture with regard to both materials and labor, and which accordingly is then susceptible of low prices of sale to the consuming public, thereby making such an animal call economically available to the buying public.

Still yet another object of the present invention is to provide a new and improved animal call which provides in the apparatuses and methods of the prior art some of the advantages thereof, while simultaneously overcoming some of the disadvantages normally associated therewith.

Even still another object of the present invention is to provide a new and improved animal call for creating a sound similar to eating sounds made by squirrels and woodpeckers.

Lastly, it is an object of the present invention to provide a new and improved animal call is comprised of a cylindrical drum having an aperture formed in opposing ends thereof. One of the apertures formed in the opposing ends has a greater width than the other. The cylindrical drum has a receiving recess formed therein intermediate of the opposing ends. An elongated handle is secured within the receiving recess formed in the cylindrical drum. The elongated handle is positioned orthogonally to the cylindrical drum. A striking bar is adapted for use in striking the cylindrical drum to generate sounds made by animals.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
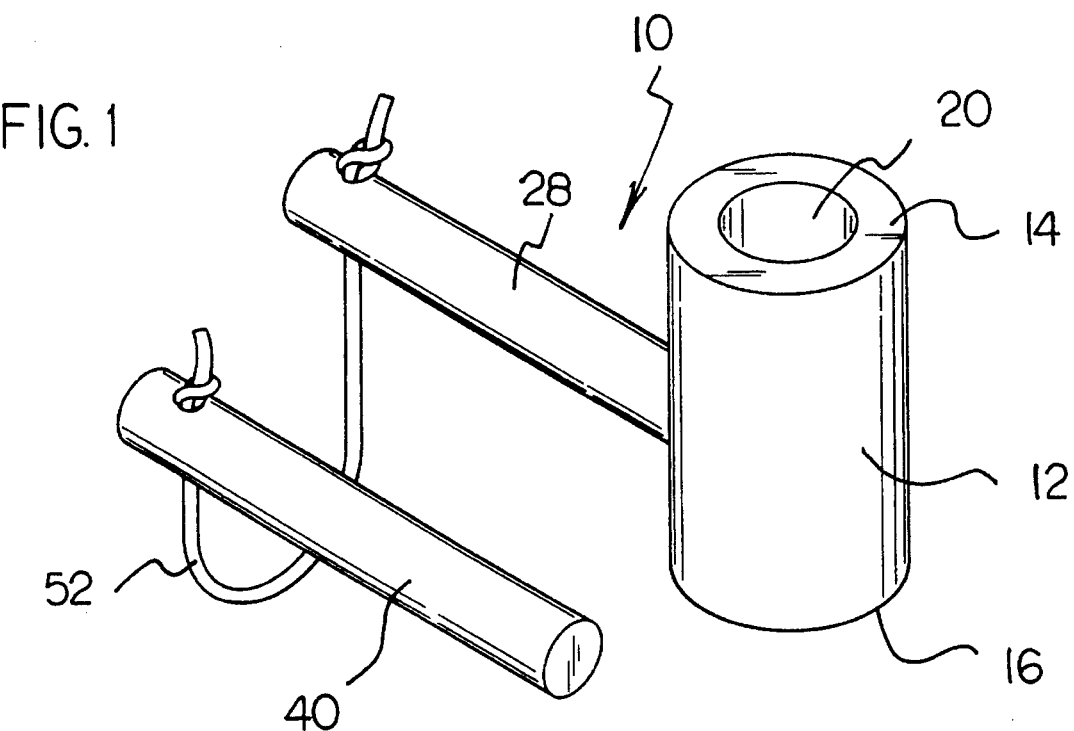
FIG. 1 is a perspective view of the preferred embodiment of the animal call constructed in accordance with the principles of the present invention.
Figure 2:
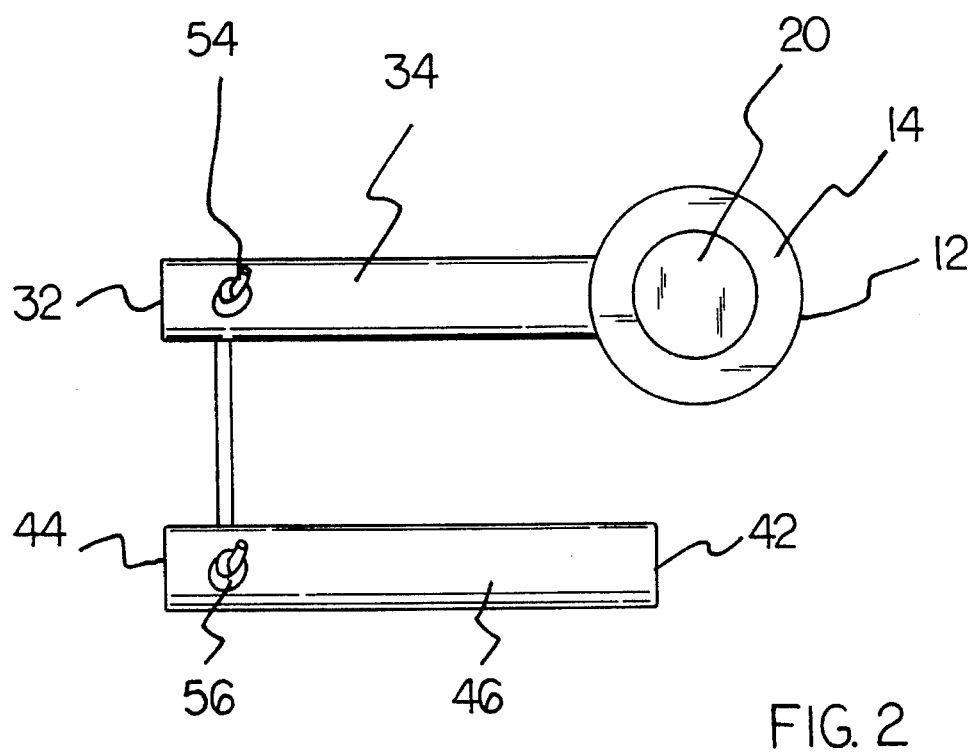
FIG. 2 is a plan view of the preferred embodiment of the present invention.
Figure 3:
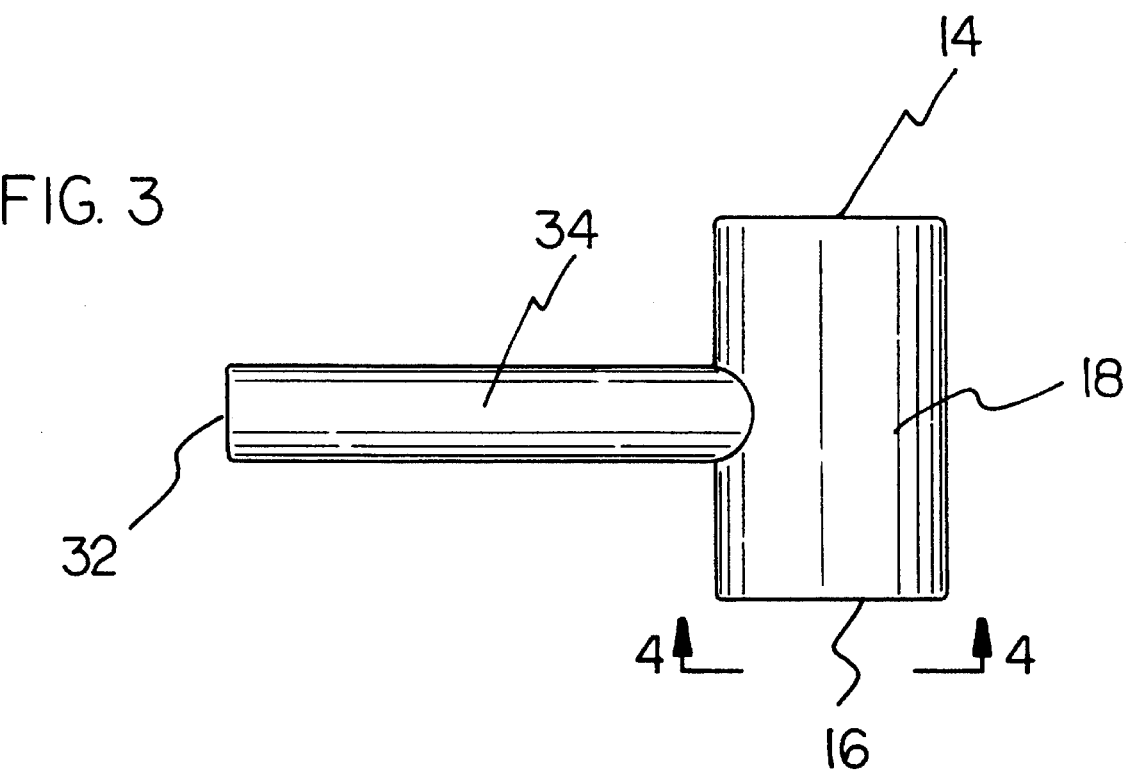
FIG. 3 is a side elevation view of the present invention.
Figure 4:
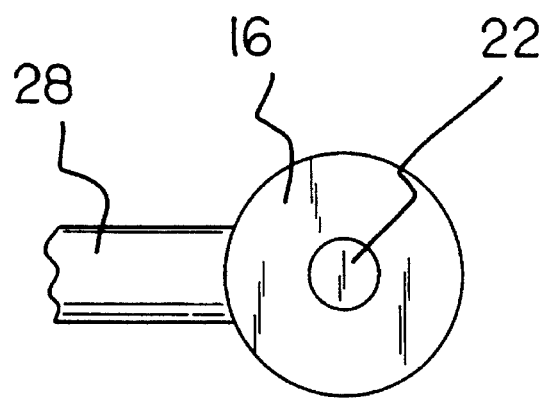
FIG. 4 is a cross-sectional view as taken along line 4—4 of FIG. 3.
Figure 5:
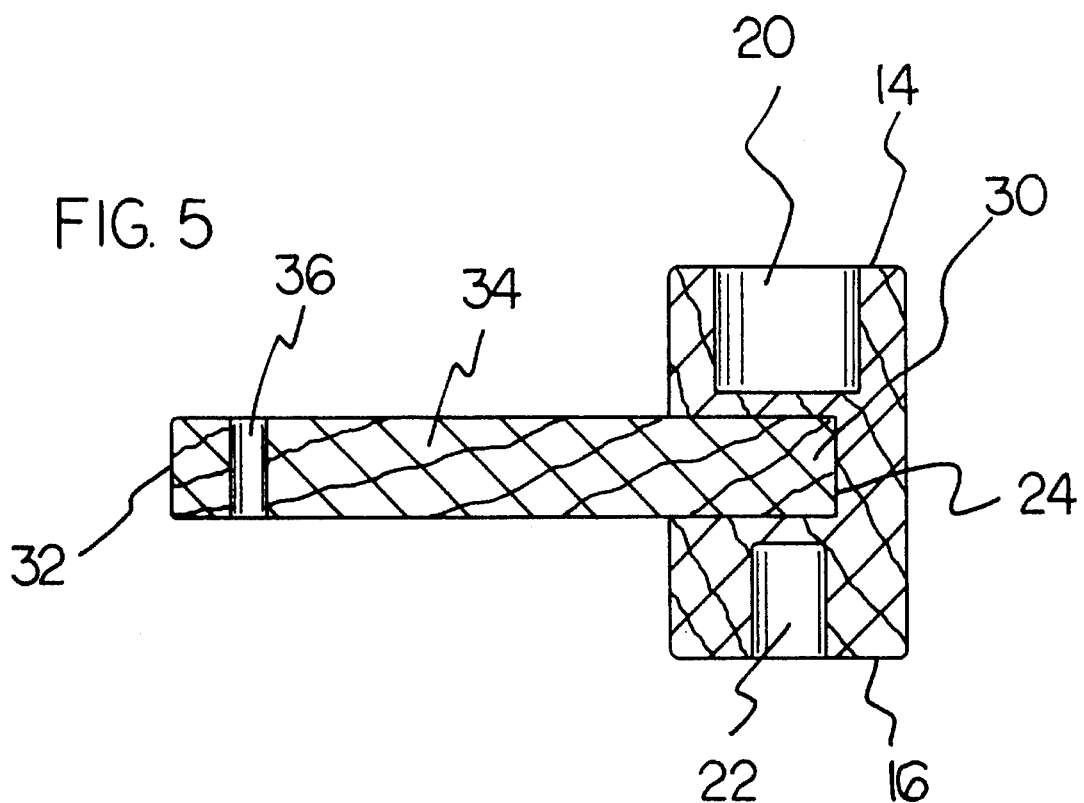
FIG. 5 is a cross-sectional view of the present invention.
Figure 6:
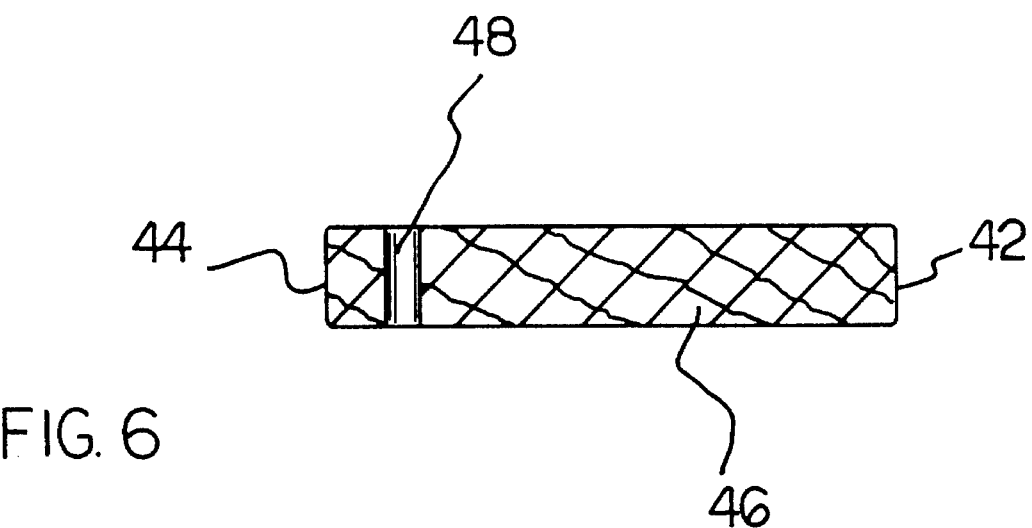
FIG. 6 is a cross-sectional view of the striking bar of the present invention. The same reference numerals refer to the same parts through the various Figures.

With reference now to the drawings, and in particular, to FIG. 1–6 thereof, the preferred embodiment of the new and improved animal call embodying the principles and concepts of the present invention and generally designated by the reference number 10 will be described.

Specifically, it will be noted in the various Figures that the device relates to a new and improved animal call for creating a sound similar to eating sounds made by squirrels and woodpeckers. In its broadest context, the device consists of a cylindrical drum, an elongated handle, a striking bar, and a leather thong.

The device 10 contains a cylindrical drum 12 having a first end 14, a second end 16, and an intermediate extent 18 therebetween. The first end 14 has an aperture 20 formed therein. The second end 16 has an aperture 22 formed therein. The aperture 20 formed in the first end 14 has a width about twice as wide as the aperture 22 formed in the second end 16. The intermediate extent 18 has a receiving recess 24 formed therein. The preferable material that the cylindrical drum 12 is constructed of is pine. The cylindrical drum 12 could be dyed a brown color or also offered with a camouflage appearance to avoid any possible accidents caused while a hunter is in the woods. The white color that defines pine is not optimal by hunters in the woods. The apertures 20,22 are of differing sizes to produce different pitched sounds to simulate noises produced by squirrels when they are eating.

The device 10 contains an elongated handle 28 having a first end 30, a second end 32, and an intermediate extent 34 therebetween. The first end 30 is secured within the receiving recess 24 formed in the intermediate extent 18 of the cylindrical drum 12. The elongated handle 28 is positioned orthogonally to the cylindrical drum 12. The elongated handle 28 has a through hole 36 formed inwardly of the second end 32 thereof. The first end 30 is secured within the receiving recess 24 of the cylindrical drum 12 by a strong glue. The elongated handle 28 being dimensioned to comfortably fit within the hunters hand. As with the cylindrical drum 12, the elongated handle 28 is preferably constructed of pine and could be dyed a brown color or also offered with a camouflage appearance to avoid any possible accidents caused while the hunter is in the woods.

The device 10 contains a striking bar 40 having a first end 42, a second end 44, and an intermediate extent 46 therebetween. The striking bar 40 has a through hole 48 formed inwardly of the second end 44 thereof. The striking bar 40 is used to contact the cylindrical drum 12 at differing angles to produce differing sounds to attract deer to be hunted. When the striking bar 40 is used to contact the cylindrical drum 12, percussion is created. Such percussion can be varied simply by repositioning the user's fingers along the cylindrical drum 12. The striking bar 40 is of a similar length and width as that of the elongated handle 28. The striking bar 40 is also preferably constructed of pine and could be dyed a brown color or also offered with a camouflage appearance to avoid any possible accidents caused while the hunter is in the woods. When done properly, one can make the sound of squirrels eating on the ground or the sound of woodpeckers eating or looking for food. Deer would be attracted to these sounds because they would associate these sounds with a safe place, where there would be no hunter. Deer and squirrel eat the same types of food, such as acorns. Turkeys also eat acorns. What better place for the turkeys to go than a place where the sounds of squirrels are eating on the ground and there is plenty of food. To a fox the sound of a squirrel eating on the ground means a safe place where there is no human and the fox being a fox has a good chance of having the squirrel as a meal.

The device 10 contains a leather thong 52 having a first end 54 and a second end 56. The first end 54 is secured to the through hole 36 of the elongated handle 28. The second end 56 is secured to the thorough hole 48 of the striking bar 40. The leather thong 52 serves to prevent the striking bar 40 from becoming displaced from the elongated handle 28 and the cylindrical drum 12. The leather thong 52 is essential when the hunter is out in the woods and spots a deer or other animal and is force to drop the device 10 to pursue the animal. The leather thong 52 prevents any component of the device 10 from being lost.

The device 10 could also include an instruction manual or sheet that would be constructed of bio-degradable recycled paper. In the instruction manual, instructions for use of the device 10 would be included. The instruction manual could also included a successful hunting scene detailing what to wear, how to position the hunter in the woods, and also the optimal times to go hunting. The instruction manual could also include basic hunting ethics and an encouragement to become a member of the National Rifle Association (NRA) and the phone number to reach the NRA.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and the manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modification and changes will readily occur to those skilled in the art, it is not desired to limit the invention to the exact construction and operation shown and described, and accordingly, all suitable modification and equivalents may be resorted to, falling within the scope of the invention.

What is claimed as being new and desired to be protected by Letters Patent of the United States is as follows:

1. An animal call for creating a sound similar to eating sounds made by squirrels and woodpeckers comprising, in combination:

a cylindrical drum having a first end, a second end, and an intermediate extent therebetween, the first end having an aperture formed therein, the second end having an aperture formed therein, the aperture formed in the first end having a width about twice as wide as the aperture formed in the second end, the intermediate extent having a receiving recess formed therein;

an elongated handle having a first end, a second end, and an intermediate extent therebetween, the first end secured within the receiving recess formed in the intermediate extent of the cylindrical drum, the elongated handle positioned orthogonally to the cylindrical drum, the elongated handle having a through hole formed inwardly of the second end thereof;

a striking bar having a first end, a second end, and an intermediate extent therebetween, the striking bar having a through hole formed inwardly of the second end thereof;

a leather thong having a first end and a second end, the first end secured to the through hole of the elongated handle, the second end secured to the thorough hole of the striking bar.

2. An animal call for creating a sound similar to eating sounds made by squirrels and woodpecker comprising, in combination:

a cylindrical drum having an aperture formed in opposing ends thereof, one of the apertures formed in the opposing ends having a greater width than the other, the cylindrical drum having a receiving recess formed therein intermediate of the opposing ends;

an elongated handle secured within the receiving recess formed in the cylindrical drum, the elongated handle positioned orthogonally to the cylindrical drum;

a striking bar adapted for use in striking the cylindrical drum to generate sounds made by animals.

3. The animal call as described in claim 2 and further including a leather thong having a first end and a second end, the first end secured to the elongated handle, the second end secured to the striking bar.

* * * * *